United States Patent
Tachibanada et al.

(10) Patent No.: US 10,557,545 B2
(45) Date of Patent: Feb. 11, 2020

(54) CONTROL APPARATUS

(71) Applicant: HONDA MOTOR CO., LTD., Tokyo (JP)

(72) Inventors: Yuya Tachibanada, Wako (JP); Yutaka Ishikawa, Wako (JP); Tetsuya Mochizuki, Wako (JP); Koichi Fushimi, Wako (JP); Masaya Tamai, Wako (JP); Ryohei Yamagishi, Wako (JP)

(73) Assignee: HONDA MOTOR CO., LTD, Tokyo (JP)

(*) Notice: Subject to any disclaimer, the term of this patent is extended or adjusted under 35 U.S.C. 154(b) by 55 days.

(21) Appl. No.: 15/914,239

(22) Filed: Mar. 7, 2018

(65) Prior Publication Data
US 2018/0283538 A1 Oct. 4, 2018

(30) Foreign Application Priority Data

Mar. 31, 2017 (JP) ................. 2017-072030

(51) Int. Cl.
B60W 10/115 (2012.01)
F16H 61/02 (2006.01)
(Continued)

(52) U.S. Cl.
CPC ......... F16H 61/0213 (2013.01); F16H 59/44 (2013.01); F16H 59/72 (2013.01);
(Continued)

(58) Field of Classification Search
CPC ........ Y10T 477/692; B60W 30/18036; B60W 30/18045; B60W 10/115; B60W 2520/10;
(Continued)

(56) References Cited

U.S. PATENT DOCUMENTS 9,199,629 B2 12/2015 Ishikawa et al.
2016/0319915 A1* 11/2016 Ishikawa ................. F16H 3/66
(Continued)

FOREIGN PATENT DOCUMENTS

JP H08-105540 A 4/1996
JP 2014-046713 A 3/2014
(Continued)

OTHER PUBLICATIONS

English translation of JP2016211623A; http://translationportal.epo.org; Jun. 25, 2019 (Year: 2019).*

(Continued)

Primary Examiner — Roger L Pang
(74) Attorney, Agent, or Firm — Thomas | Horstemeyer, LLP

(57) ABSTRACT

A control apparatus of an automatic transmission, which includes a mechanical engaging mechanism functioning as a brake, includes a determination unit determining, when a selected gear is a lowest forward speed gear, and the mechanism is in a second state, whether to switch the mechanism to the first state, and a switching processing unit switching the mechanism to the first state based on a determination result. In the first state, only rotation of a predetermined rotational element provided in planetary gear mechanisms in a first direction is restricted. In the second state, rotation of the predetermined rotational element in both the first and second direction is restricted. The determination unit determines to switch the mechanism to the first state at least on condition that a driving force is larger than a predetermined driving force.

3 Claims, 14 Drawing Sheets

(51) Int. Cl.
*F16H 59/44* (2006.01)
*F16H 59/72* (2006.01)
*F16H 61/04* (2006.01)
F16H 59/46 (2006.01)
F16H 59/66 (2006.01)
F16H 3/66 (2006.01)
F16H 3/44 (2006.01)
B60W 30/18 (2012.01)

(52) U.S. Cl.
CPC ....... *F16H 61/0437* (2013.01); *B60W 10/115* (2013.01); *B60W 30/18036* (2013.01); *B60W 30/18045* (2013.01); *B60W 2510/107* (2013.01); *B60W 2520/10* (2013.01); *B60W 2550/142* (2013.01); *B60Y 2300/424* (2013.01); *F16H 3/66* (2013.01); *F16H 59/46* (2013.01); *F16H 59/66* (2013.01); *F16H 2003/445* (2013.01); *F16H 2059/467* (2013.01); *F16H 2059/663* (2013.01); *F16H 2061/044* (2013.01); *F16H 2200/0069* (2013.01); *F16H 2200/2012* (2013.01); *F16H 2200/2046* (2013.01); *F16H 2200/2048* (2013.01); *F16H 2200/2066* (2013.01); *F16H 2200/2082* (2013.01); *Y10T 477/692* (2015.01)

(58) Field of Classification Search
CPC ...... B60W 2510/107; B60W 2550/142; B60Y 2300/424; F16H 59/72; F16H 59/44; F16H 2061/044; F16H 2200/2066; F16H 2200/2082; F16H 2059/663; F16H 59/66; F16H 59/46
See application file for complete search history.

(56) References Cited

U.S. PATENT DOCUMENTS

| | | | |
|---|---|---|---|
| 2016/0319931 A1* | 11/2016 | Ishikawa | F16H 61/0204 |
| 2016/0363216 A1* | 12/2016 | Tachibanada | F16H 3/66 |
| 2017/0138465 A1* | 5/2017 | Tachibanada | F16H 61/0204 |
| 2017/0268667 A1* | 9/2017 | Tachibanada | F16H 61/12 |
| 2018/0216726 A1* | 8/2018 | Tachibanada | F02D 41/0215 |

FOREIGN PATENT DOCUMENTS

| | | |
|---|---|---|
| JP | 2014-196823 A | 10/2014 |
| JP | 2016-211623 A | 12/2016 |
| JP | 2016-211625 A | 12/2016 |

OTHER PUBLICATIONS

Notification of Reasons for Refusal (w/ English translation) issued for Japanese Patent Application No. 2017-072030 dated Oct. 19, 2018.

\* cited by examiner

FIG. 2A

|  | C1 | C2 | C3 | B1 | B2 | B3 | F1 | GEAR RATIO |
|---|---|---|---|---|---|---|---|---|
| RVS |  |  | ○ |  | ○ |  | ○ | 4.008 |
| 1st |  |  |  | ○ | ○ | (○) | △/○ | 5.233 |
| 2nd |  | ○ |  | ○ | ○ |  | (△) | 3.367 |
| 3rd |  |  | ○ | ○ | ○ |  | (△) | 2.298 |
| 4th |  | ○ | ○ | ○ |  |  | (△) | 1.705 |
| 5th | ○ |  | ○ | ○ |  |  | (△) | 1.363 |
| 6th | ○ | ○ | ○ |  |  |  | (△) | 1.000 |
| 7th | ○ |  | ○ |  | ○ |  | (△) | 0.786 |
| 8th | ○ | ○ |  |  | ○ |  | (△) | 0.657 |
| 9th | ○ |  |  |  | ○ | ○ | (△) | 0.584 |
| 10th | ○ | ○ |  |  |  | ○ | (△) | 0.520 |
| P/N |  |  |  |  |  |  | △/○ | — |
| RPM | ○ |  | ○ |  |  | ○ | △→○ | — |

FIG. 2B

| PLANETARY GEAR MECHANISM | GEAR RATIO |
|---|---|
| P1 | 2.681 |
| P2 | 1.914 |
| P3 | 1.614 |
| P4 | 2.734 |

FIG. 5

| STEP | ENGAGING OPERATION | | | | | | SHIFT CONDITION |
|---|---|---|---|---|---|---|---|
| | B3 | B2 | B1 | C3 | C2 | C1 | F1 | |
| 1 | – | ↓ | ↓ | – | – | – | △ | COMPLETION OF RELEASE |
| 2 | ○ | – | – | ○ | – | ○ | △ | INPUT ROTATION SPEED ≅ 0 COMPLETION OF ENGAGEMENT OF C1 ETC. |
| 3 | ○ | – | – | ○ | – | ○ | ○ | COMPLETION OF SWITCHING OF F1 |
| 4 | ↓ | ○ | – | ○ | – | ↓ | ○ | |

↓ : RELEASING
○ : ENGAGE
– : RELEASE
F1/△ : ONE-WAY ROTATION PERMISSION
F1/○ : ROTATION INHIBITION

F I G. 6A
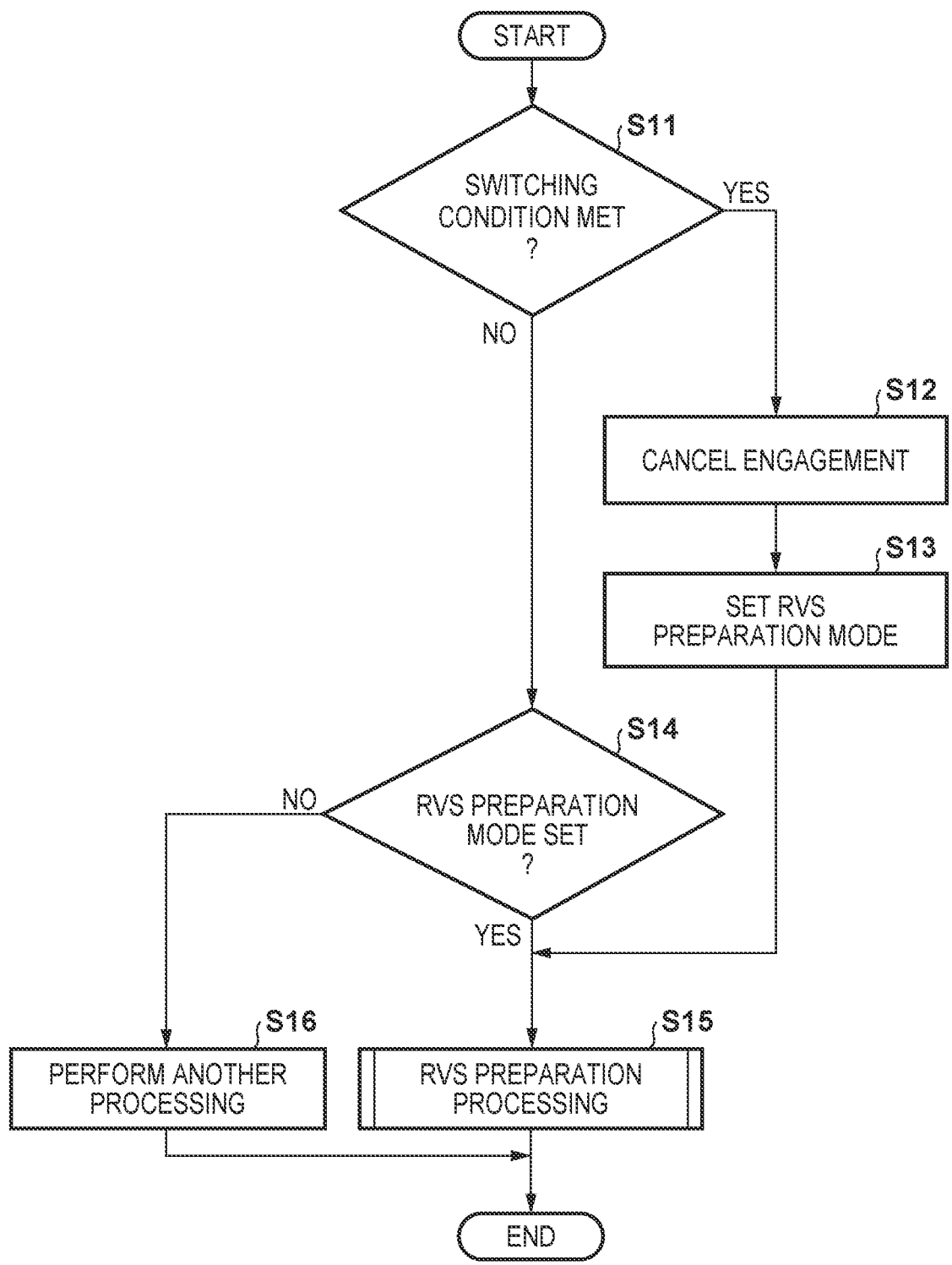

CONTROL APPARATUS

BACKGROUND OF THE INVENTION

Field of the Invention

The present invention relates to a control apparatus of an automatic transmission.

Description of the Related Art

An automatic transmission generally includes planetary gear mechanisms and engaging mechanisms such as a clutch and a brake, and implements each gear range by switching the power transmission path by the engaging mechanisms. As the engaging mechanisms, employing a mechanical engaging mechanism has been proposed in addition to a hydraulic engaging mechanism. In particular, an arrangement that uses a clutch (two-way clutch) capable of switching to a state to do two-way rotation restriction as a brake has been proposed. The mechanical engaging mechanism is configured to perform mechanical driving transmission and cannot smoothly switch the state in some cases depending on the acting state of a load on an engaging portion in the mechanism. The acting state of the load often depends on the traveling state of the vehicle. If the traveling state is not appropriate when switching is necessary, switching may be impossible. To solve this, techniques of coping with a traveling state in which the mechanical engaging mechanism is difficult to switch in advance have been proposed (Japanese Patent Laid-Open Nos. 2016-211623 and 2016-211625).

If a driving force needed for switching of the state of the mechanical engaging mechanism is large, upsizing of an actuator or improvement of the strength of a constituent component is needed, resulting in an increase in cost or weight.

SUMMARY OF THE INVENTION

It is an object of the present invention to cope with a traveling state in which switching is difficult in advance while reducing a driving force necessary for switching of a mechanical engaging mechanism.

According to an aspect of the present invention, there is provided a control apparatus of an automatic transmission, wherein the automatic transmission includes: an input shaft to which a driving force is input from a driving source through a torque converter; an output member; a plurality of planetary gear mechanisms configured to transmit the driving force input to the input shaft to the output member; and a plurality of engaging mechanisms capable of establishing a plurality of gears by switching a transmission path of the driving force in the plurality of planetary gear mechanisms, one of the plurality of engaging mechanisms is a mechanical engaging mechanism functioning as a brake, the mechanical engaging mechanism can be switched to a first state in which only rotation of a predetermined rotational element of a plurality of rotational elements provided in the plurality of planetary gear mechanisms in a first direction is restricted and a second state in which the rotation of the predetermined rotational element in both the first direction and a second direction reverse to the first direction is restricted, the plurality of gears include: a lowest forward speed gear in which the mechanical engaging mechanism can be established in both the first state and the second state; a forward gear in which a gear ratio is higher than in the lowest forward speed gear, and the mechanical engaging mechanism cannot be established in the second state; and a reverse gear in which the mechanical engaging mechanism is established in the second state, the control apparatus comprises: a determination unit configured to, when a selected gear is the lowest forward speed gear, and the mechanical engaging mechanism is in the second state, determine whether to switch the mechanical engaging mechanism to the first state; and a switching processing unit configured to switch the mechanical engaging mechanism to the first state based on a determination result of the determination unit, and the determination unit determines to switch the mechanical engaging mechanism to the first state at least on condition that the driving force is larger than a predetermined driving force.

Further features of the present invention will become apparent from the following description of exemplary embodiments (with reference to the attached drawings).

BRIEF DESCRIPTION OF THE DRAWINGS

FIG. 2A is a view showing an example of the engagement table of engaging mechanisms;

FIG. 2B is a view showing the gear ratios of planetary gear mechanisms;

FIG. 5 is a schematic explanatory view of processing when selecting a reverse range;

FIGS. 6A and 6B are flowcharts showing an example of processing of the control apparatus shown in FIG. 4A;

DESCRIPTION OF THE EMBODIMENTS

First Embodiment

Figure 1:
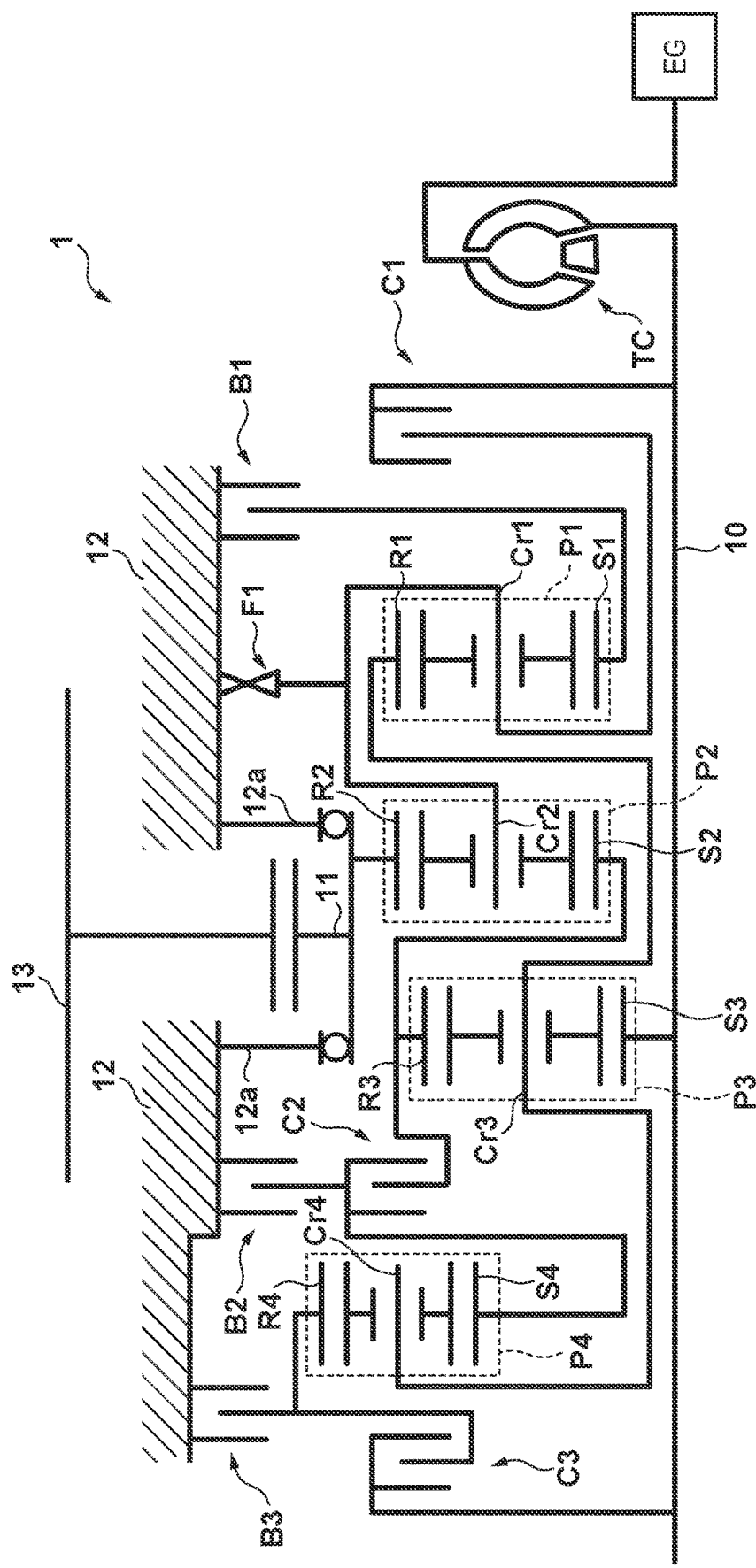
FIG. 1 is a skeleton diagram of an automatic transmission according to an embodiment of the present invention.

FIG. 1 is a skeleton diagram of an automatic transmission 1 according to an embodiment of the present invention. Referring to FIG. 1, the automatic transmission 1 includes an input shaft 10 rotatably axially supported in a casing 12 that forms a transmission case, an output member 11 rotatably supported by support members 12a supported in the casing 12 so as to be coaxial with respect to the input shaft 10, and an output shaft (counter shaft) 13.

A driving force from an internal combustion engine EG (to be sometimes simply referred to as EG) is input to the input shaft 10, and the input shaft 10 is rotated by the driving force. A starting device is provided between the input shaft 10 and the internal combustion engine EG. Examples of the starting device are a clutch type starting device (single disc clutch, multiple disc clutch, or the like) and a hydraulic coupling type starting device (torque converter or the like). In this embodiment, a torque converter TC is provided. Hence, the driving force of the internal combustion engine EG is input to the input shaft 10 through the torque converter TC.

The output member 11 includes a gear concentric to the input shaft 10. The output shaft 13 includes a gear that meshes with the gear. The rotation of the input shaft 10 changes its speed through transmission mechanisms to be described below and is then transmitted to the output shaft 13. The rotation (driving force) of the output shaft 13 is transmitted to driving wheels through, for example, differential gears (not shown).

As the transmission mechanisms, the automatic transmission 1 includes planetary gear mechanisms P1 to P4 and engaging mechanisms C1 to C3, B1 to B3, and F1. In this embodiment, all the planetary gear mechanisms P1 to P4 are single pinion type planetary gear mechanisms. The planetary gear mechanisms P1 to P4 transmit the driving force from the input shaft 10 to the output member 11. The planetary gear mechanisms P1 to P4 can form a plurality of driving force transmission paths. The engaging mechanisms C1 to C3, B1 to B3, and F1 switch the driving force transmission paths of the planetary gear mechanisms P1 to P4, thereby establishing a plurality of gear ranges.

The planetary gear mechanisms P1 to P4 include sun gears S1 to S4, ring gears R1 to R4, and carriers Cr1 to Cr4 each supporting a pinion gear, respectively, as rotational elements (12 in total), and are disposed to be coaxial with respect to the input shaft 10.

When ordered in accordance with the arrangement order at intervals corresponding to gear ratios shown in the velocity diagram of FIG. 3 (to be described later), the sun gear S1, the carrier Cr1, and the ring gear R1 of the planetary gear mechanism P1 can be referred to as a first rotational element, a second rotational element, and a third rotational element in this order.

Similarly, the ring gear R2, the carrier Cr2, and the sun gear S2 of the planetary gear mechanism P2 can be referred to as a fourth rotational element, a fifth rotational element, and a sixth rotational element in this order.

Similarly, the sun gear S3, the carrier Cr3, and the ring gear R3 of the planetary gear mechanism P3 can be referred to as a seventh rotational element, an eighth rotational element, and a ninth rotational element in this order.

Similarly, the ring gear R4, the carrier Cr4, and the sun gear S4 of the planetary gear mechanism P4 can be referred to as a 10th rotational element, a 11th rotational element, and a 12th rotational element in this order.

Each of the engaging mechanisms C1 to C3, B1 to B3, and F1 functions as a clutch or a brake. A clutch connects/disconnects the rotational elements provided in the automatic transmission 1. A brake connects/disconnects the rotational elements provided in the automatic transmission 1 to/from the casing 12. The rotational elements provided in the automatic transmission 1 include the input shaft 10 and the sun gears, ring gears, and carriers of the planetary gear mechanisms P1 to P4.

In this embodiment, the engaging mechanisms C1 to C3 are clutches, and the engaging mechanisms B1 to B3 and F1 are brakes. Hence, the engaging mechanisms C1 to C3 are sometimes called the clutches C1 to C3, and the engaging mechanisms B1 to B3 and F1 are sometimes called the brakes B1 to B3 and F1. When the engaging mechanisms C1 to C3 and B1 to B3 are switched between an engaging state (fastening state) and a release state, and the state of the engaging mechanism F1 is switched, the driving force transmission path from the input shaft 10 to the output member 11 is switched, and the plurality of gear ranges are implemented.

In this embodiment, all the engaging mechanisms C1 to C3 and B1 to B3 are assumed to be hydraulic friction engaging mechanisms. Examples of the hydraulic friction engaging mechanism are dry and wet single disc clutches and dry and wet multiple disc clutches.

The engaging mechanism F1 is provided between the casing 12 and predetermined rotational elements (here, the carriers Cr1 and Cr2 connected to each other). The engaging mechanism F1 can be switched between a one-way rotation permission state (to be sometimes referred to as OWC) in which the rotation of the predetermined rotational elements (carriers Cr1 and Cr2) is restricted only in one direction, and rotation in the reverse direction is permitted and a rotation inhibition state (to be sometimes referred to as TWC) in which rotation is restricted in both directions.

In the one-way rotation permission state, the same function as a so-called one-way clutch is implemented. In this state, the rotational elements transmit the driving force in one rotation direction but slip in the reverse direction. In this embodiment, the engaging mechanism F1 functions as a brake. For this reason, if the engaging mechanism F1 is in the one-way rotation permission state, the predetermined rotational elements (carriers Cr1 and Cr2) are permitted to rotate only in one direction. In the rotation inhibition state, the rotational elements transmit the driving force in both rotation directions. In this embodiment, the engaging mechanism F1 functions as a brake. For this reason, if the engaging mechanism F1 is in the rotation inhibition state, the predetermined rotational elements (carriers Cr1 and Cr2) are inhibited from rotating in both directions.

An example of the structure of the engaging mechanism F1 will be described later. For example, a known two-way clutch can be employed. Some known two-way clutches can be switched between the one-way rotation permission state, the rotation inhibition state, and a two-way rotation permission state by driving control of a corresponding hydraulic actuator or electromagnetic actuator. Some known two-way clutches can further switch the one-way rotation permission state between a forward rotation permission state and a reverse rotation permission state. In this embodiment, switching between the one-way rotation permission state and the rotation inhibition state suffices, and using only the permission state in one rotation direction as the one-way rotation permission state suffices. However, a two-way clutch capable of selecting another state such as the two-way rotation permission state may be employed.

The connection relationship between the components will be described next with reference to FIG. 1.

The sun gear S3 of the planetary gear mechanism P3 is connected to the input shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11. Hence, the planetary gear mechanism P2 is a planetary gear mechanism that performs driving transmission to the output shaft 13.

The clutch C1 connects the input shaft 10 to the carrier Cr1 of the planetary gear mechanism P1 and the carrier Cr2 connected to the carrier Cr1 in the engaging state, and disconnects them in the release state. Note that the release state will sometimes be referred to as a disengaging state. The clutch C2 connects the ring gear R3 of the planetary gear mechanism P3 to the sun gear S4 of the planetary gear mechanism P4 in the engaging state, and disconnects them in the release state. The clutch C3 connects the input shaft 10 to the ring gear R4 of the planetary gear mechanism P4 in the engaging state, and disconnects them in the release state.

The brake B1 connects the casing 12 to the sun gear S1 of the planetary gear mechanism P1 in the engaging state, and disconnects them in the release state. The brake B2 connects the casing 12 to the sun gear S4 of the planetary gear mechanism P4 in the engaging state, and disconnects them in the release state. The brake B3 connects the casing 12 to the ring gear R4 of the planetary gear mechanism P4 in the engaging state, and disconnects them in the release state.

As already described, the brake F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 12 in the rotation inhibition state.

FIG. 2A is an engagement table (fastening table) showing the engaging combination of the engaging mechanisms provided in the automatic transmission 1. FIG. 2B shows the gear ratios of the planetary gear mechanisms provided in the automatic transmission 1.

Figure 3:
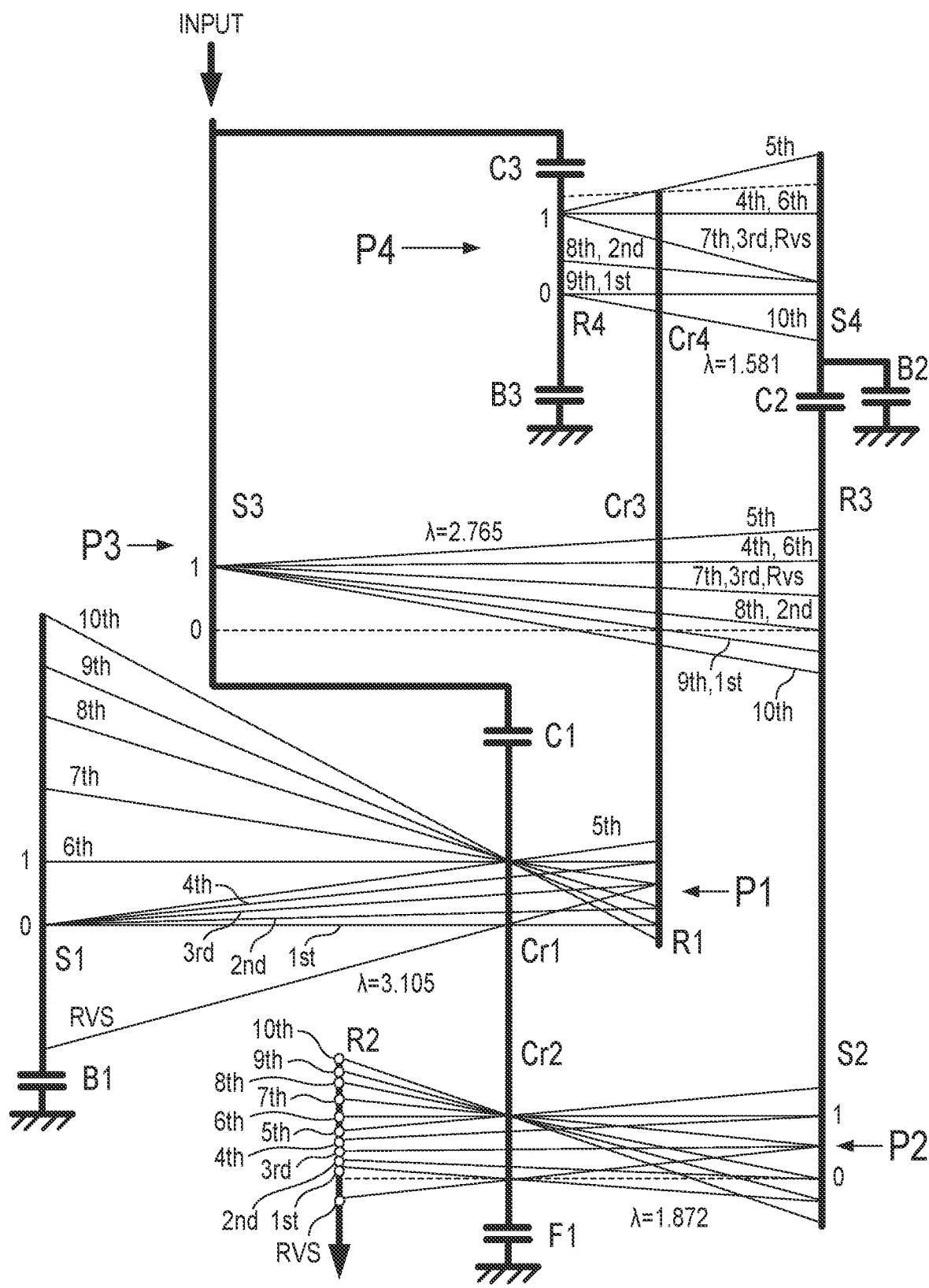
FIG. 3 is a velocity diagram of the automatic transmission shown in FIG. 1.

FIG. 3 is a velocity diagram of the automatic transmission 1. "Gear ratio" in FIG. 2A indicates the gear ratio between the input shaft 10 and the output member 11.

In this embodiment, 10 forward ranges or gears (1st to 10th) and one reverse range or gear (RVS) can be established. "P/N" represents non-running ranges; "P", a parking range; and "N", a neutral range. "RPM" represents an engaging combination in RVS preparation processing (to be described later). In this processing, the brake F1 is switched from the one-way rotation permission state to the rotation inhibition state.

In the example of the engagement table shown in FIG. 2A, "○" indicates the engaging state, and no mark indicates the release state. Note that there are included engaging mechanisms that are set in the engaging state for smooth change to adjacent gear ranges, although the engagement is not essential to establish the gear ranges. For example, in the 1st gear (1st), engagement of the brake B2 is not essential. However, when changing to the reverse range (RVS) or 2nd gear (2nd), the brake B2 is set in the engaging state for the purpose of decreasing the engaging mechanisms to switch the engaging state. Similarly, in the 5th gear (5th), engagement of the clutch C3 is not essential. However, when changing to the 4th gear (4th) or 6th gear (6th), the clutch C3 is set in the engaging state for the purpose of decreasing the engaging mechanisms to switch the engaging state.

As for the brake F1, "○" indicates the rotation inhibition state, and "Δ" indicates the one-way rotation permission state. In the 1st gear (1st), the brake F1 can be set in either the rotation inhibition state or the one-way rotation permission state. In the rotation inhibition state, the engine brake is enabled. In the 1st gear, the brake F1 is set in the one-way rotation permission state. The engine brake is switched between the enabled state and a disabled state by engaging or releasing the brake B3. In FIG. 2A, "○" of the brake B3 in the 1st gear (1st) indicates this.

An algorithm to determine which state is set for the brake F1 in the 1st gear (1st) can appropriately be designed. In this embodiment, the state before a change to the 1st gear (1st) is inherited. For example, when changed from the reverse range (RVS) to the 1st gear (1st), the brake F1 remains in the rotation inhibition state in the 1st gear (1st). However, if, for example, the vehicle speed exceeds a predetermined speed, the brake F1 is switched to the one-way rotation permission state. Similarly, when changed from other forward ranges (2nd to 10th) to the 1st gear (1st), the brake F1 remains in the one-way rotation permission state in the 1st gear (1st).

In the non-running ranges (P/N) as well, the state of the brake F1 can be either the rotation inhibition state or the one-way rotation permission state. In this embodiment, the state before a change to the non-running ranges (P/N) is inherited, as in the 1st gear (1st).

In the 2nd gear (2nd) to the 10th gear (10th), the brake F1 is set in the one-way rotation permission state, but slips because of the structure of the automatic transmission 1. For this reason, the state of the brake F1 is indicated by "(Δ)". If the brake F1 is a mechanical engaging mechanism capable of selecting the above-described two-way rotation permission state, the brake F1 can also be set in the two-way rotation permission state in the 2nd gear (2nd) to the 10th gear (10th).

Note that in this embodiment, the one-way rotation permission state is selected as the state of the brake F1 in each of the 2nd gear (2nd) to the 10th gear (10th), and these ranges cannot be established in the rotation inhibition state. However, an arrangement that selects the rotation inhibition state can also be employed depending on the arrangement of the automatic transmission 1.

The velocity diagram of FIG. 3 shows the rotation speed ratio of each element to the input to the input shaft 10 in each gear range. The ordinate represents the speed ratio. "1" indicates the same rotation speed as the input shaft 10, and "0" indicates a stop state. The abscissa is based on the gear ratio between the rotational elements of the planetary gear mechanisms P1 to P4. λ is the gear ratio between a carrier Cr and a sun gear S. Note that in FIG. 3, elements corresponding to the output shaft 13 are not illustrated.

<Control Apparatus>

Figure 4A:
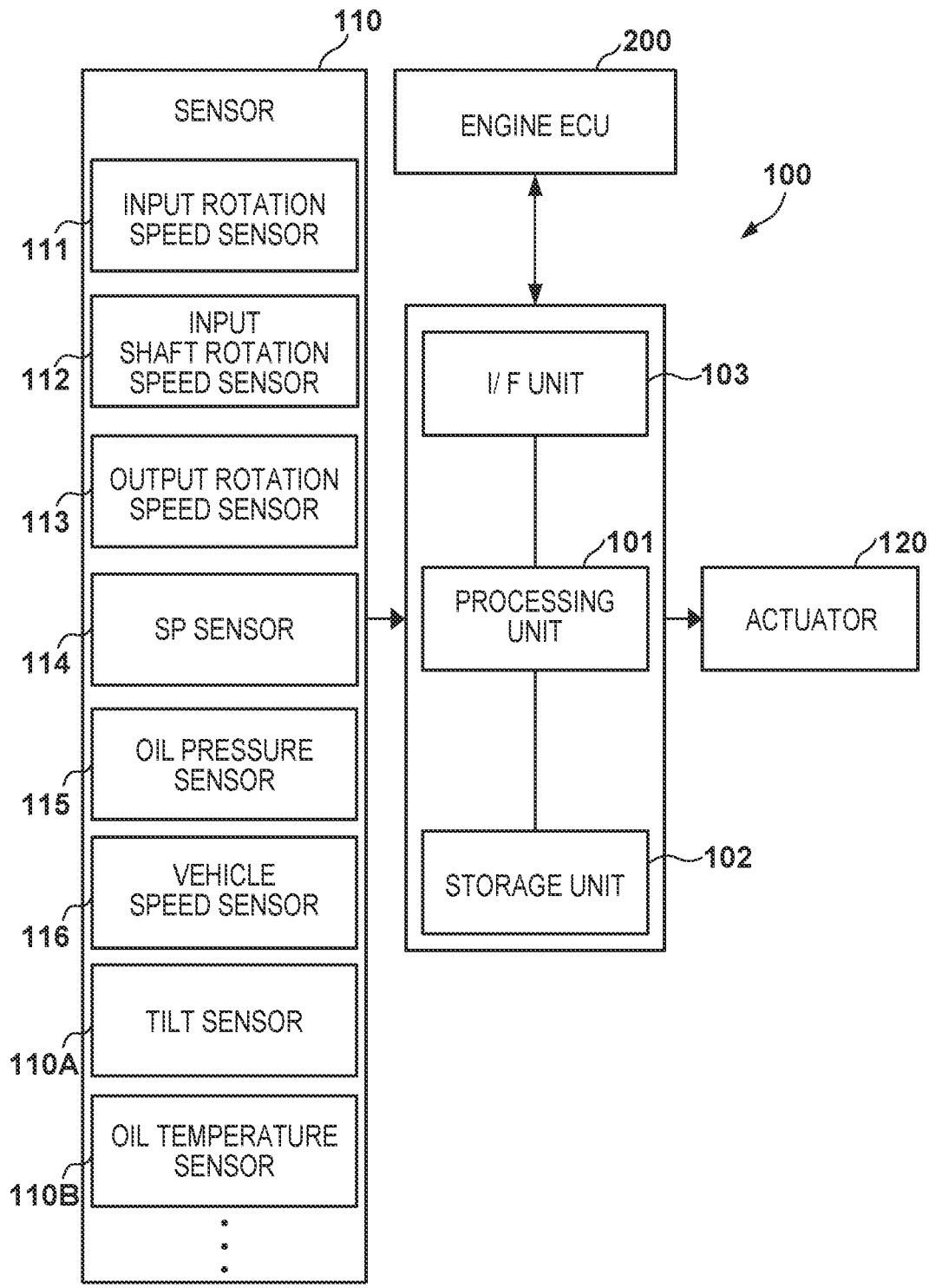
FIG. 4A is a block diagram showing an example of the control apparatus of the automatic transmission shown in FIG. 1.

FIG. 4A is a block diagram of a control apparatus 100 of the automatic transmission 1. The control apparatus 100 can control not only the automatic transmission 1 but also the internal combustion engine EG and the torque converter TC. In this embodiment, the internal combustion engine EG is assumed to be controlled by an engine ECU 200 provided independently of the control apparatus 100. The control apparatus 100 can receive various kinds of information of the internal combustion engine EG and the vehicle from the engine ECU 200. The various kinds of information can include the driving force (output torque) of the internal combustion engine EG. The control apparatus 100 can also transmit the information of the automatic transmission 1 to the engine ECU 200.

The control apparatus 100 includes a processing unit 101 such as a CPU, a storage unit 102 such as a RAM and ROM, and an I/F unit 103 that interfaces the processing unit 101 and an external device or the engine ECU 200. The I/F unit 103 is formed from, for example, a communication interface, an input/output interface, or the like.

The processing unit 101 executes a program stored in the storage unit 102 and controls various kinds of actuators 120 based on the detection results of various kinds of sensors 110.

The various kinds of sensors 110 include various kinds of sensors provided in the automatic transmission 1. FIG. 4A illustrates the following sensors.

An input rotation speed sensor 111 is a sensor that detects a rotation speed input from the internal combustion engine EG to the torque converter TC, that is, the rotation speed (engine speed) of the output shaft of the internal combustion engine EG. The information of the rotation speed of the internal combustion engine EG may be received from the engine ECU 200. An input shaft rotation speed sensor 112 is a sensor that detects the rotation speed of the input shaft 10. A slip ratio: ETR of the torque converter TC is calculated by ETR (%)=(rotation speed detected by input shaft rotation speed sensor 112)/rotation speed detected by input rotation speed sensor 111)× 100

An output shaft rotation speed sensor 113 is a sensor that detects the rotation speed of the output shaft 13.

An SP sensor (shift position sensor) 114 is a sensor that detects a shift position selected by the driver. In this embodiment, four types of shift positions, that is, P range (parking range), D range (forward range), N range (neutral range), and R range (reverse range) are assumed as the shift positions. If the D range is selected, the processing unit 101 selects one of the 1st gear (1st) to the 10th gear (10th) in accordance with a gear change map stored in the storage unit 102 and changes the gear. If the R range is selected, the processing unit 101 selects the reverse range.

An oil pressure sensor 115 includes a sensor that detects the oil pressure of hydraulic oil of each of the engaging mechanisms C1 to C3 and B1 to B3. A vehicle speed sensor 116 detects the traveling speed of the vehicle in which the automatic transmission 1 is mounted.

A tilt sensor 110A detects the tilt of the traveling road of the vehicle. Accordingly, it is possible to detect whether the vehicle is traveling downhill. An oil temperature sensor 110B detects the temperature of hydraulic oil of the automatic transmission 1.

The various kinds of actuators 120 include various kinds of actuators provided in the automatic transmission 1. For example, the actuators 120 include an electromagnetic actuator such as an electromagnetic solenoid that switches the operation state of each of the engaging mechanisms C1 to C3, B1 to B3, and F1. The processing unit 101 thus controls the various kinds of actuators 120.

Figure 4B:
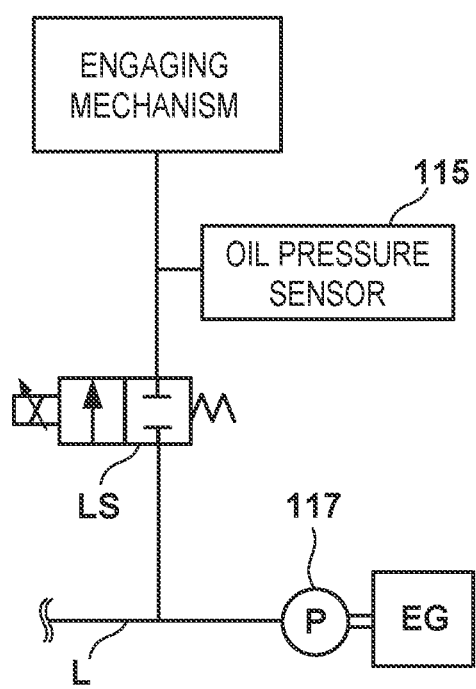
FIG. 4B is a view showing an example of the disposition of an oil pressure sensor.

FIG. 4B shows an example of the disposition of the oil pressure sensor 115. For example, the oil pressure sensor 115 can be provided for each of the engaging mechanisms C1 to C3 and B1 to B3. This makes it possible to detect the oil pressure of hydraulic oil of each engaging mechanism. Note that the oil pressure sensor 115 need not always be provided for each engaging mechanism.

A solenoid valve LS that supplies the hydraulic oil is assigned to each engaging mechanism. Engagement and release of each engaging mechanism can be switched by opening or blocking a supply line L of the hydraulic oil by the solenoid valve LS. The oil pressure sensor 115 is provided so as to receive the hydraulic oil supplied from the solenoid valve LS to the engaging mechanism. The detection result of the oil pressure sensor 115 indicates the oil pressure of the hydraulic oil supplied to the engaging mechanism. The hydraulic oil is pressure-fed to the supply line L by an oil pump 117 driven by the internal combustion engine EG.

<TWC Switching Control of Brake F1>

In this embodiment, the brake F1 is in the rotation inhibition state in the reverse range. When switching from the forward range or non-running range to the reverse range, the brake F1 is sometimes switched from the one-way rotation permission state to the rotation inhibition state. At this time, to reduce unusual noise or vibration, the difference between the rotation speed of the brake F1 on the side of the casing 12 and that on the side of the carrier Cr2 is preferably 0. In other words, the rotation speed of the carrier Cr2 is preferably 0.

To do this, a combination of engaging mechanisms that changes the rotation speed of the carrier Cr2 to 0 intervenes. In this embodiment, there is no sensor for directly measuring the rotation speed of the carrier Cr2. For this reason, the carrier Cr2 and the input shaft 10 are connected, and it is confirmed from the detection result of the input shaft rotation speed sensor 112 or the like that the rotation speed of the carrier Cr2 is 0. After that, the brake F1 is switched to the rotation inhibition state.

FIG. 5 shows the engaging combination of engaging mechanisms when switching the gear range from the 1st forward gear to the reverse range. When the gear range is the 1st forward gear, the brakes B1 and B2 are in the engaging state, as shown in FIG. 2A. The brake F1 is assumed to be in the one-way rotation permission state.

First, as indicated by step 1 in FIG. 5, the brakes B1 and B2 are controlled to the release state. When release of the brakes B1 and B2 is completed, the process advances to step 2.

In step 2, the clutches C1 and C3 and the brake B3 engage. The ring gear R2 and the output shaft 13 are rotatable, and the driving wheels can freely rotate. It is therefore possible to avoid an unexpected behavior of the vehicle.

As is apparent from the velocity diagram of FIG. 3, when the clutch C3 and the brake B3 engage, the input shaft 10 is fixed to the casing 12. When the clutch C1 engages, the carrier Cr2 is connected to the input shaft 10.

Note that in this embodiment, step 2 is performed next to step 1. However, step 1 and step 2 may be performed simultaneously. More specifically, while performing control to set the brakes B1 and B2 in the release state, control to engage the clutches C1 and C3 and the brake B3 may be performed. This can improve responsiveness when switching the gear range to the reverse range.

If predetermined conditions are met, the process advances to step 3. The predetermined conditions are conditions to confirm that the rotation speed of the carrier Cr2 is 0. Basically, the conditions are completion of engagement of the clutch C1 and detection result of input rotation speed sensor 111<predetermined value (for example, a value that can be regarded as 0). As for the completion of engagement of the clutch C1, for example, when the detection result of the oil pressure sensor 115 of the clutch C1 indicates a predetermined oil pressure or when the control amount of the solenoid valve LS for the clutch C1 reaches a predetermined value, it can be determined that engagement is completed. The same determination method can be employed even for completion of engagement of other engaging mechanisms.

In step 3, the brake F1 is switched from the one-way rotation permission state to the rotation inhibition state. Since the difference between the rotation speed of the brake F1 on the side of the casing 12 and that on the side of the carrier Cr2 is 0, occurrence of unusual noise or vibration can be avoided. When switching of the brake F1 is completed, the process advances to step 4. In step 4, the clutch C1 and the brake B3 are released, and the brake B2 engages. The combination for the reverse range thus holds (FIG. 2A).

In some cases, the processing of steps 2 and 3 is called RVS preparation processing, and the processing of step 4 is called RVS in-gear processing. In terms of control, when step 1 is completed, an RVS preparation mode is set as the control state of the gear range. When the RVS preparation mode is set, RVS preparation processing is performed. In addition, when step 3 is completed, an RVS in-gear mode is set as the control state of the gear range. When the RVS in-gear mode is set, RVS in-gear processing is performed. Such mode setting is managed by, for example, providing a mode information storage area in the storage unit 102.

An example of processing executed by the processing unit 101 concerning the contents of control shown in FIG. 5 will be described with reference to FIGS. 6A and 6B.

FIG. 6A will be referred to. In step S11, it is determined whether a condition to switch the brake F1 from the one-way rotation permission state to the rotation inhibition state is met. In this embodiment, if the brake F1 is in the one-way rotation permission state, and the SP sensor 114 detects that the driver has switched the shift range from another range to the reverse range, it is determined that the condition is met. If YES in step S11, the process advances to step S12. Otherwise, the process advances to step S14.

In step S12, the engaging mechanisms (for example, the brakes B1 and B2) in the engaging state are released, as described in step 1 shown in FIG. 5. In step S13, the RVS preparation mode is set as the control mode. After that, the process advances to step S15.

In step S14, it is determined whether the RVS preparation mode is set. If YES in step S14, the process advances to step S15. Otherwise, the process advances to step S16. In step S15, RVS preparation processing is performed. Details will be described later. In step S16, another processing is performed, and the processing of one unit ends.

Figure 6B:
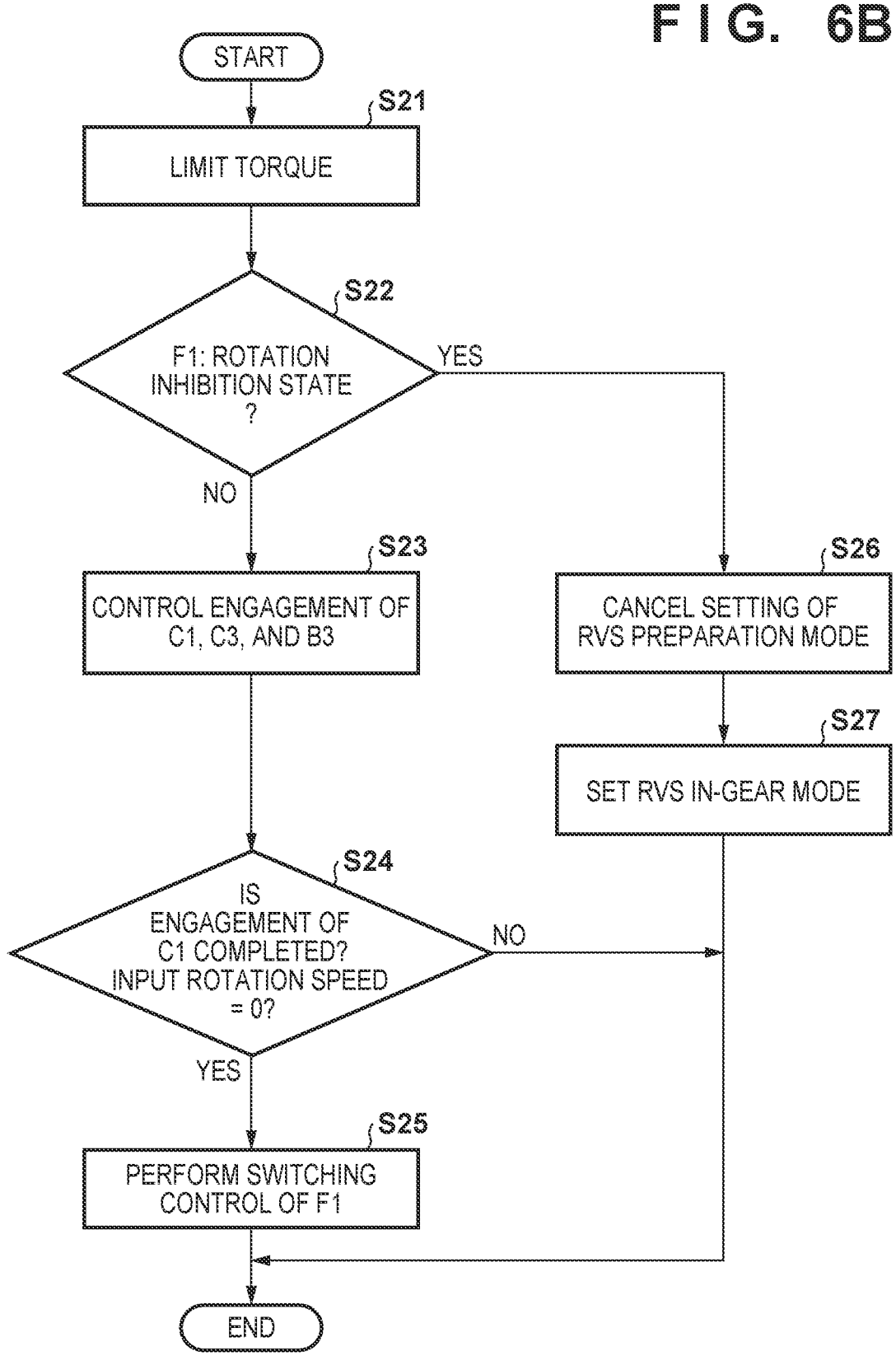

FIG. 6B will be referred to. FIG. 6B is a flowchart showing RVS preparation processing of step S15. In step S21, torque limitation of the driving source of the automatic transmission 1 is executed. For example, the output of the internal combustion engine EG is reduced within the range in which the necessary oil pressures of the engaging mechanisms and the like are ensured.

In step S22, it is determined whether switching of the brake F1 to the rotation inhibition state is completed. If YES in step S22, the process advances to step S26. Otherwise, the process advances to step S23.

In step S23, control to engage the clutches C1 and C3 and the brake B3 starts, as described in step 2 shown in FIG. 5. The clutches C1 and C3 and the brake B3 can be engaged by increasing the control amounts to the solenoid valves LS of these engaging mechanisms stepwise. When the process of step S23 is repeated a plurality of times, the engagement is completed.

In step S24, it is determined whether engagement of the clutch C1 is completed, and the rotation speed of the input shaft 10 is 0, as described in step 2 shown in FIG. 5. If all the conditions are met, the process advances to step S25. If not all the conditions are met, the processing of one unit ends.

In step S25, the state of the brake F1 is switched to the rotation inhibition state, as described in step 3 shown in FIG. 5. Since the switching is done in a state in which the difference between the rotation speed of the brake F1 on the side of the casing 12 and that on the side of the carrier Cr2 is 0, it is possible to prevent occurrence of unusual noise or vibration and avoid breakage of the brake F1.

In step S26, setting of the RVS preparation mode is canceled. In step S27, the RVS in-gear mode is set. With this setting, processing of releasing the clutch C1 and the brake B3 and engaging the brake B2 is performed, as described in step 4 shown in FIG. 5, in another routine (for example, step S16 in FIG. 6A). The processing thus ends.

<Mechanical Engaging Mechanism>

The brake F1 is a component that performs mechanical driving transmission. In an engaging mechanism of this type, switching of a state cannot smoothly be performed in some cases depending on the acting state of a load on an internal engaging portion. This point will be described below.

Figure 7:
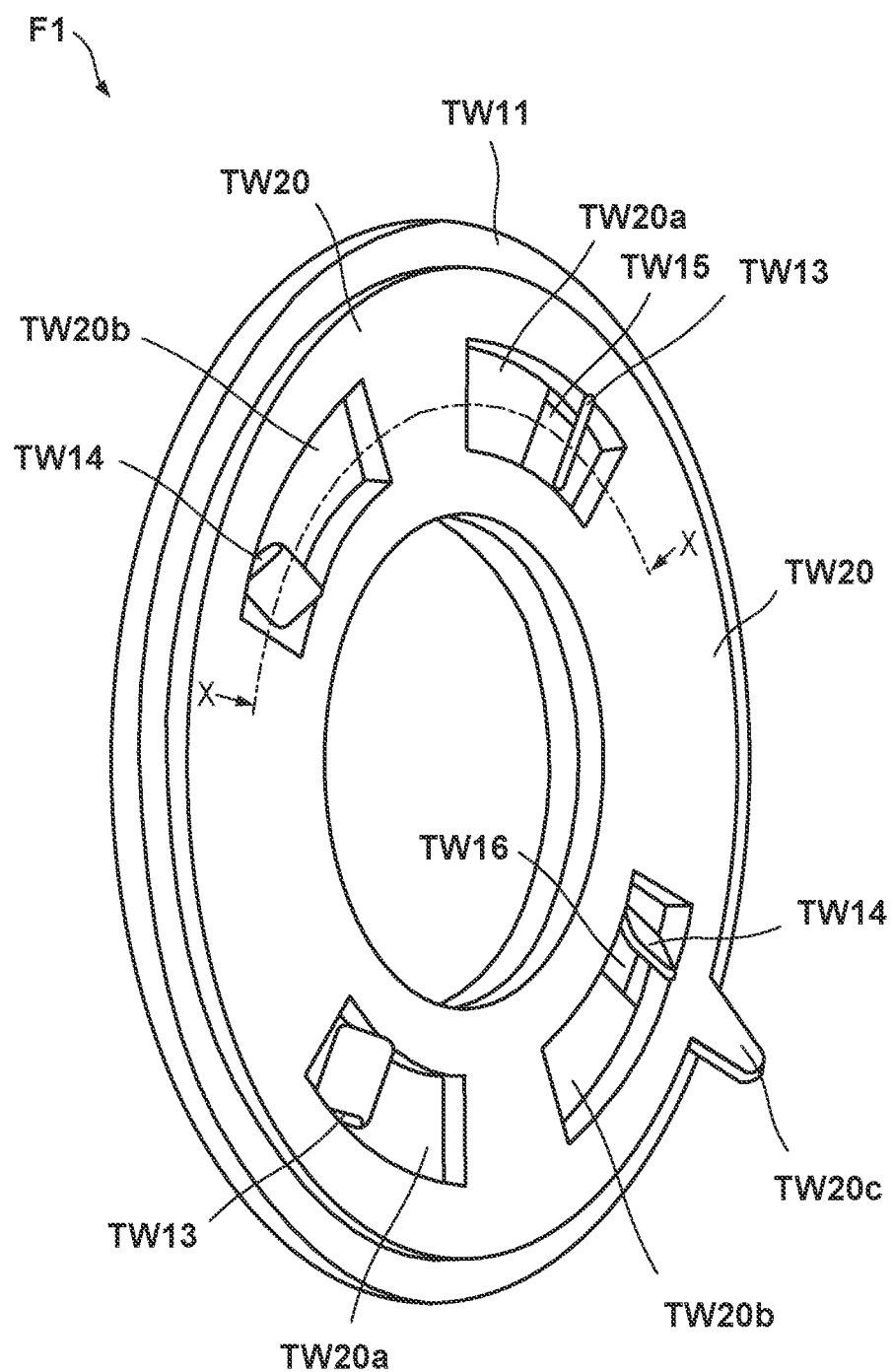
FIG. 7 is an explanatory view of a mechanical engaging mechanism.
Figure 8A:
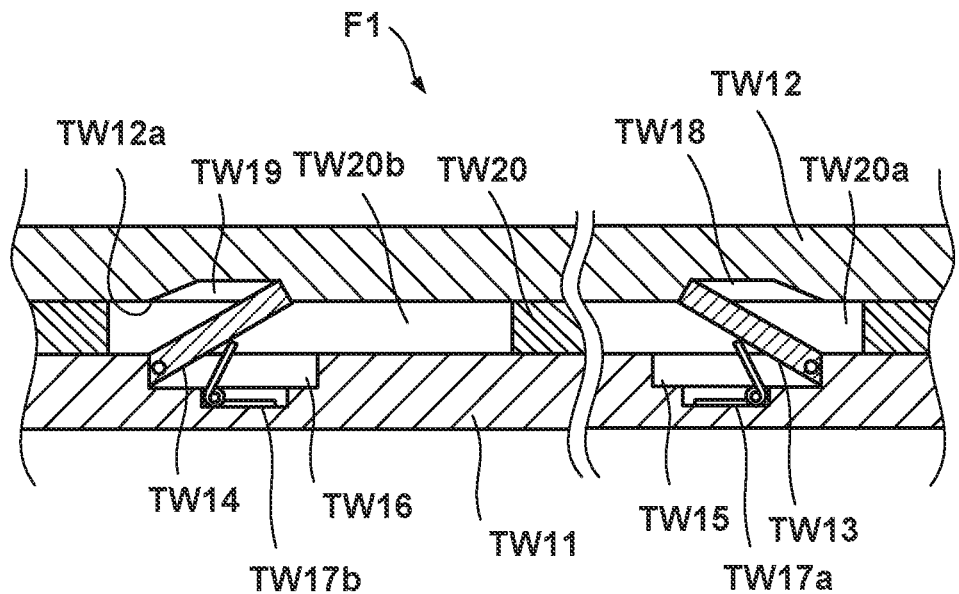
FIGS. 8A and 8B are explanatory views of the mechanical engaging mechanism.

FIG. 7 is a partial perspective view showing an example of the structure of the brake F1 according to this embodiment. FIG. 8A is a sectional view taken along a line X-X in FIG. 7.

The brake F1 includes a fixed plate TW11 fixed to the casing 12, a rotation plate TW12 (not shown in FIG. 7) fixed to the carriers Cr1 and Cr2, and a switching plate TW20. The fixed plate TW11 is formed into an annular shape (doughnut shape). The rotation plate TW12 is also formed into an annular shape (doughnut shape), like the fixed plate TW11. The fixed plate TW11 and the rotation plate TW12 are arranged concentrically.

Storage portions TW15 and TW16 are formed in the fixed plate TW11. A swing portion TW13 is swingably provided in the storage portion TW15. A swing portion TW14 is swingably provided in the storage portion TW16. In the swing portions TW13 and TW14, the swing centers are located at ends opposite to each other. A spring 17a that biases the swing portion TW13 in one direction is provided in the storage portion TW15, and a spring 17b that biases the swing portion TW14 in one direction is provided in the storage portion TW16.

In the rotation plate TW12, a concave portion TW18 that engages with the swing portion TW13 is formed, and a concave portion TW19 that engages with the swing portion TW14 is also formed.

The switching plate TW20 is arranged between the fixed plate TW11 and the rotation plate TW12. The switching plate TW20 is also formed into an annular shape (doughnut shape). In the switching plate TW20, notch holes TW20a and TW20b are provided at positions corresponding to the swing portions TW13 and TW14. A projecting portion TW20c projecting outward in the radial direction is provided at the outer edge of the switching plate TW20. The switching plate TW20 can freely swing with respect to the fixed plate TW11. When the projecting portion TW20c is biased by an electromagnetic actuator or a hydraulic actuator, the switching plate TW20 can be made to swing with respect to the fixed plate TW11.

FIG. 8A shows the rotation inhibition state. That is, the swing portion TW13 engages with the concave portion TW18, and the swing portion TW14 engages with the concave portion TW19. For this reason, the rotation plate TW12 cannot rotate relative to the fixed plate TW11.

Figure 8B:
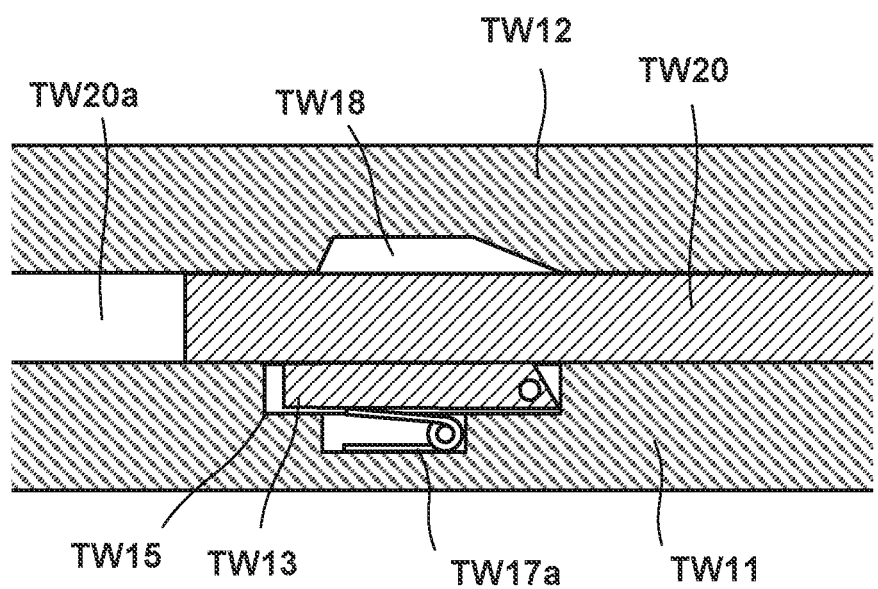

When the switching plate TW20 is swung from the rotation inhibition state, the state can be switched to the one-way rotation permission state. FIG. 8B shows an example. The example of FIG. 8B shows a state in which along with the movement of the switching plate TW20, the swing portion TW13 is pressed against the edge of the notch hole TW20a of the switching plate TW20 and stored in the storage portion TW15. Accordingly, the engagement between the swing portion TW13 and the concave portion TW18 is canceled. In this state, the engagement between the swing portion TW14 and the concave portion TW19 is maintained. Hence, the rotation plate TW12 can rotate only in one direction with respect to the fixed plate TW11 (one-way rotation permission state).

Switching between the rotation inhibition state and the one-way rotation permission state can be done in this way in accordance with the position of the switching plate TW20.

Figure 9A:
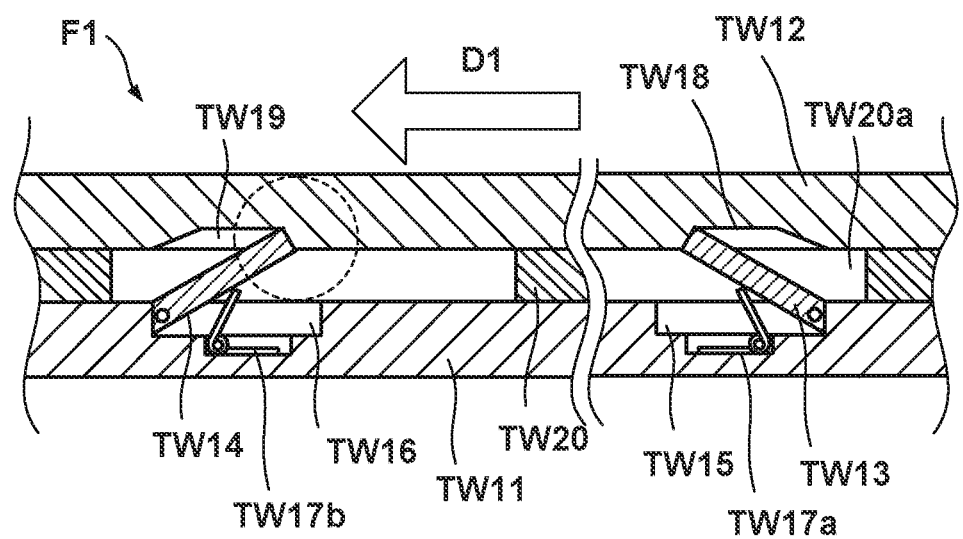
FIGS. 9A and 9B are explanatory views of the mechanical engaging mechanism.
Figure 9B:
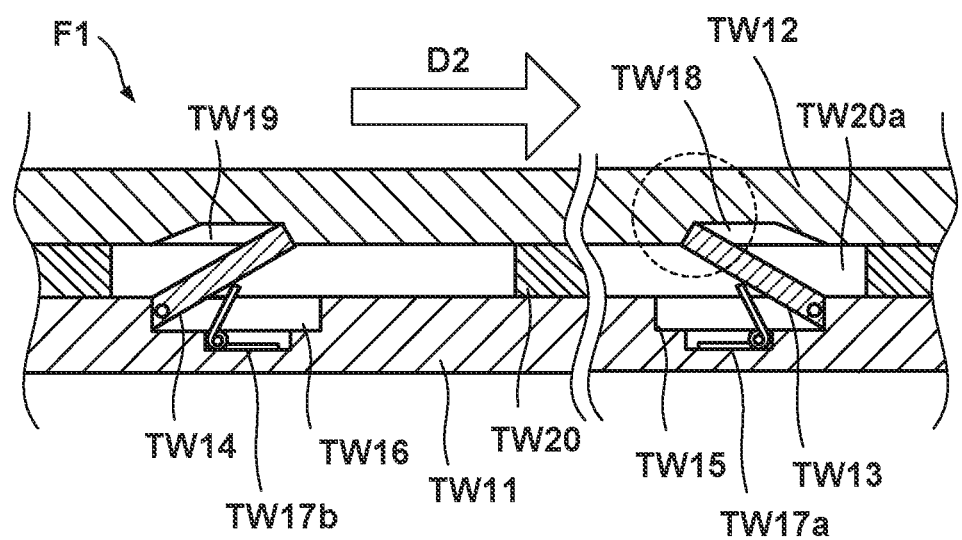

A case in which switching of the brake F1 cannot smoothly be performed will be described next. In this embodiment, as already described, when the brake F1 is in the rotation inhibition state in the 1st gear, the engine brake is enabled. FIGS. 9A and 9B will be referred to. FIGS. 9A and 9B assume a case in which the brake F1 is in the rotation inhibition state in the 1st gear.

FIG. 9A shows a case of acceleration. The driving force of the internal combustion engine EG acts in a direction of an arrow D1 on the rotation plate TW12 fixed to the carriers Cr1 and Cr2. This load is borne by the swing portion TW14 but not by the swing portion TW13. Hence, the brake F1 can be switched to the one-way rotation permission state shown in FIG. 8B by swinging the switching plate TW20.

FIG. 9B shows a case of deceleration or a case in which the vehicle is traveling downhill by inertia. A driving force from the wheels acts in a direction of an arrow D2 on the rotation plate TW12 fixed to the carriers Cr1 and Cr2. This load is borne by the swing portion TW13 but not by the swing portion TW14. Even when the swing portion TW13 is swung to the state shown in FIG. 8B by swinging the switching plate TW20 in this state, a case in which switching cannot smoothly be performed may occur because an end of the swing portion TW13 meshes with the concave portion TW18. That is, when the 1st gear is selected, switching of the brake F1 from the rotation inhibition state to the one-way rotation permission state is restricted by the traveling state.

As a measure, it can be considered that the brake F1 is always set in the one-way rotation permission state when the 1st gear is selected. However, when putting the vehicle in a garage or the like, the forward range and the reverse range are alternately repetitively selected in some cases. To establish the reverse range, the brake F1 is set in the rotation inhibition state by RVS preparation processing. A time lag is generated from selection of the R range by the driver to the establishment of the reverse range, and smooth start may be impossible.

In this embodiment, the traveling state in which the brake F1 is difficult to switch is coped with in advance by switching control to be described below. As already described, in a case in which the vehicle is traveling downhill by inertia, switching is difficult, as shown in FIG. 9B. In this embodiment, it is determined whether the vehicle is traveling downhill or not. In downhill traveling, the brake F1 is set in the one-way rotation permission state in advance. This makes it possible to cope with the traveling state in which switching of the brake F1 to the one-way rotation permission state is difficult in advance.

<OWC Switching Control of Brake F1>

Figure 10:
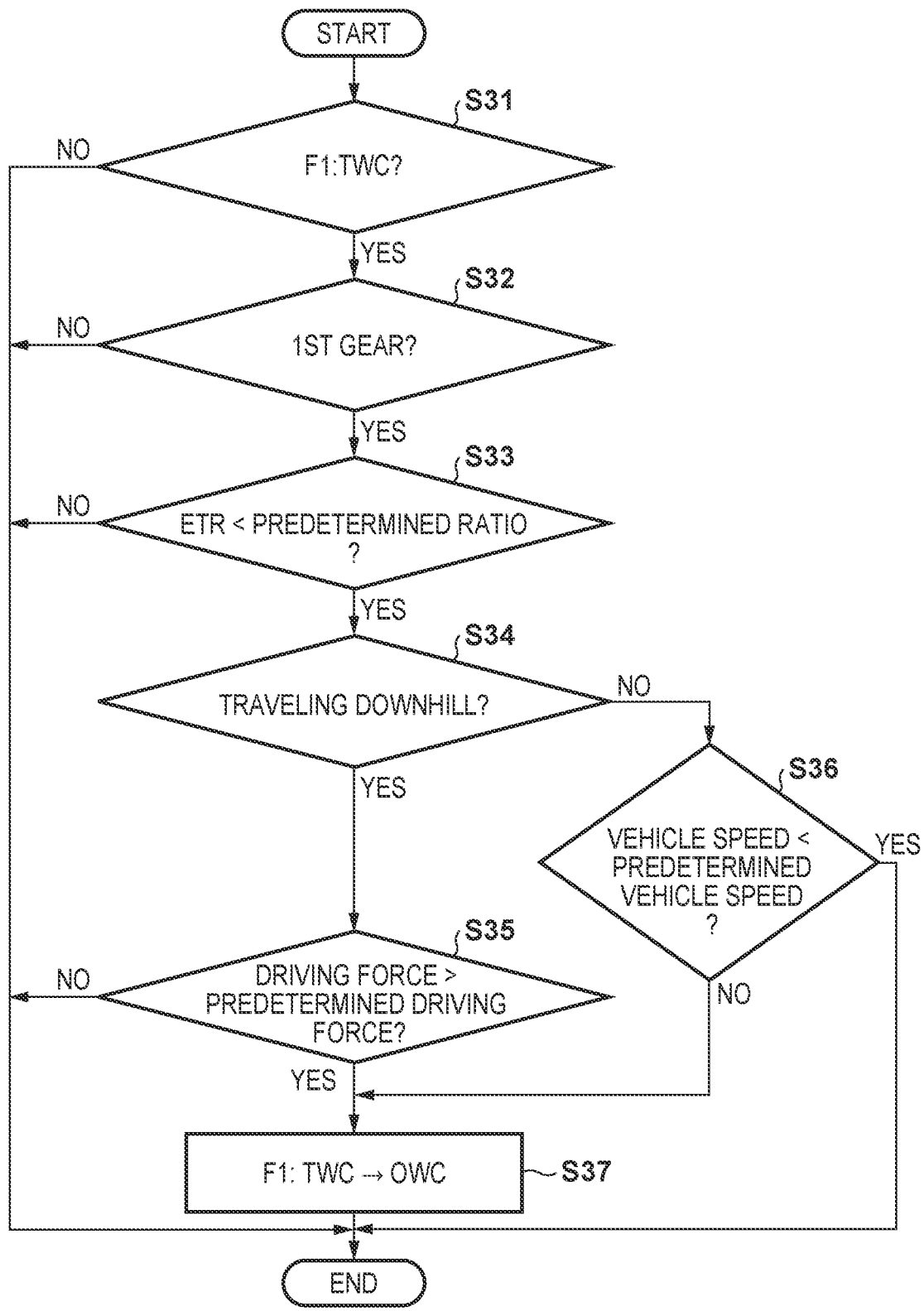
FIG. 10 is a flowchart showing an example of processing of the control apparatus shown in FIG. 4A.

An example of processing executed by the processing unit 101 concerning switching control of switching the brake F1 from TWC to OWC in the 1st gear will be described with reference to FIG. 10.

In step S31, it is determined whether the brake F1 is in TWC (rotation inhibition state). If the brake F1 is in TWC, the process advances to step S32. If the brake F1 is in OWC (one-way rotation permission state), the processing of one unit ends. In step S32, it is determined whether the current gear range is the 1st gear. If the current gear range is the 1st gear, the process advances to step S33. If the current gear range is not the 1st gear, the processing of one unit ends.

In step S33, it is determined whether there is a possibility that a load in the direction D2 is acting on the brake F1. For this determination, another parameter can also be employed.

In this embodiment, however, the slip ratio of the torque converter TC is used as a reference, and it is determined whether the slip ratio of the torque converter TC is less than a predetermined ratio. The predetermined ratio is, for example, 100%.

A case in which the ETR is less than 100% is a case in which the rotation speed detected by the input rotation speed sensor 111 is larger than the rotation speed detected by the input shaft rotation speed sensor 112. That is, the driving force is input from the internal combustion engine EG, and the vehicle is assumed to be in an acceleration state. To the contrary, a case in which the ETR is not less than 100% is a case in which the rotation speed detected by the input rotation speed sensor 111 is equal to or less than the rotation speed detected by the input shaft rotation speed sensor 112. That is, the vehicle is assumed to be traveling at a constant speed or decelerating, or traveling downhill by inertia. In this state, a load in the direction D2 is readily strongly applied to the carriers Cr1 and Cr2 (to the brake F1).

If the ETR is not less than the predetermined ratio, it is determined that the possibility that a load in the direction D2 is acting on the brake F1 is high, and the processing of one unit ends. If the ETR is less than the predetermined ratio, it is determined that the possibility that a load in the direction D2 is acting on the brake F1 is low, and the process advances to step S34.

In step S34, it is determined whether the vehicle is traveling downhill. Whether the vehicle is traveling downhill can be determined based on the detection result of the tilt sensor 110A. As another method of determining whether the vehicle is traveling downhill, for example, it can be estimated based on the acceleration of the vehicle. More specifically, whether the vehicle is traveling downhill can be estimated, including its gradient, based on the difference between an actual acceleration and a theoretical acceleration on a flat road, which is calculated from the output torque of the internal combustion engine EG, the ratio and efficiency of the automatic transmission 1, the tire diameter, the traveling resistance (a tire rolling resistance and an air resistance), and the like. As still another determination method, whether the vehicle is traveling downhill can be estimated, including its gradient, based on map information and the current position.

In step S35, it is determined whether the driving force exceeds a predetermined driving force. If the driving force exceeds the predetermined driving force, the process advances to step S37. If the driving force does not exceed the predetermined driving force, it is determined that the possibility that a load in the direction D2 is acting on the brake F1 is high, and the processing of one unit ends.

The driving force here is an input torque (turbine torque) to the input shaft 10. It is determined, by the determination of the ETR in step S33, that the possibility that a load in the direction D2 is acting on the brake F1 is low. However, when switching from TWC to OWC, to enable switching under a lower load, the switching (step S37) is executed on condition that the input torque exceeds the predetermined driving force. When the input torque is high, a load in the direction D2 does not act on the brake F1 or becomes small. Accordingly, the brake F1 including an actuator with a small output can be selected. In addition, it is advantageous from the viewpoint of the strength and durability of the constituent components of the brake F1. As a result, this contributes to reduction of cost or weight.

The input torque can be calculated by multiplying the output torque of the internal combustion engine EG by the amplification of the torque converter TC. The information of the output torque of the internal combustion engine EG can be received from the engine ECU 200. The amplification of the torque converter TC can be calculated from the ETR. In addition, the input torque can also be calculated from the ETR, the torque ratio and the capacity coefficient of the torque converter TC, and the rotation speed of the internal combustion engine EG.

The predetermined driving force may be a fixed value or a variable value. If the predetermined driving force is a variable value, it may be set based on at least one of the oil temperature of the hydraulic oil of the automatic transmission 1, the vehicle speed of the vehicle in which the automatic transmission 1 is mounted, and the down gradient of the traveling road on which the vehicle travels, or may be mapped using at least two of them as parameters. The map may be stored in the storage unit 102 and referred to. The oil temperature can be detected by the oil temperature sensor 110B, the vehicle speed can be detected by the vehicle speed sensor 116, and the down gradient can be detected by the tilt sensor 110A.

The brake F1 is immersed in hydraulic oil. If the oil temperature of the hydraulic oil is low, its viscosity tends to be high (the oil tends to be sticky), and this may be a resistance to the switching operation of the brake F1. To prevent this, when the oil temperature is low, the predetermined driving force may be set larger than in a case in which the oil temperature is high. Alternatively, when the oil temperature falls within a predetermined range, the predetermined driving force may be set large.

The higher the vehicle speed is, the larger the rotation speed difference between the rotational elements connected/disconnected by the brake F1 tends to be. This may be a resistance to the switching operation of the brake F1. To prevent this, when the vehicle speed is high, the predetermined driving force may be set larger than in a case in which the vehicle speed is low. Alternatively, when the vehicle speed falls within a predetermined range, the predetermined driving force may be set large.

The larger the down gradient is, the more strongly the load in the direction D2 tends to act on the brake F1. This may be a resistance to the switching operation of the brake F1. To prevent this, when the down gradient is large, the predetermined driving force may be set larger than in a case in which the down gradient is small. Alternatively, when the down gradient falls within a predetermined range, the predetermined driving force may be set large.

In step S36, it is determined whether the vehicle speed is less than a predetermined vehicle speed. If the vehicle speed is less than the predetermined vehicle speed, the brake F1 is kept in TWC, and the processing of one unit ends. If the vehicle speed is equal to or more than the predetermined vehicle speed, the process advances to step S37. If the vehicle speed is less than the predetermined vehicle speed, there is a possibility that the gear range is switched to the reverse range. Hence, in this embodiment, the brake F1 is maintained in TWC. On the other hand, if the vehicle speed is equal to or more than the predetermined vehicle speed, the possibility that the gear range is switched to the reverse range becomes low. Hence, the brake F1 is switched to OWC.

The predetermined vehicle speed can be, for example, 8 km/h. Alternatively, it may be, for example, 5 km/h. Otherwise, it may be, for example, 3 km/h.

In step S37, processing of switching the brake F1 from TWC to OWC is executed. After that, the processing of one unit ends.

Note that a case in which the vehicle is traveling downhill by inertia will be described. Since the brake F1 is switched to OWC in advance by the processes of steps S34 to S37, a situation in which the brake F1 is set in TWC, and the vehicle is traveling downhill by inertia is substantially avoided. In this way, the brake F1 is switched to OWC before a traveling state in which the switching of the brake F1 from TWC to OWC is difficult occurs, and the traveling state in which the switching is difficult can be coped with in advance.

Second Embodiment

In the first embodiment, an example in which when it is determined that the vehicle is traveling downhill, the brake F1 is switched from TWC to OWC has been described. In this embodiment, brake B3 is engaged by the following switching preparation control, thereby reducing the restriction of the traveling state as much as possible.

<OWC Switching Preparation Control and OWC Switching Control of Brake F1>

In this embodiment, because of the structure of an automatic transmission 1, in a case in which the gear range is the 1st gear, and the brake F1 is in the one-way rotation permission state, the brake B3 is engaged, thereby causing the brake B3 to bear a load in a direction D2, which acts on carriers Cr1 and Cr2.

This will be described in detail. Referring to the velocity diagram of FIG. 3, when the 1st gear is selected, brakes B1 and B2 are engaged. When the brake B3 is engaged in this state, carriers Cr4 and Cr3 and a ring gear R1 are fixed. In addition, the carriers Cr1 and Cr2 are fixed. When the brake F1 is in the one-way rotation permission state, and the brake B3 is engaged, the carriers Cr1 and Cr2 are fixed. Hence, the brake B3 (and the brakes B1 and B2) bears a load acting on the carriers Cr1 and Cr2.

In this embodiment, in a case in which the brake F1 is in the one-way rotation permission state, and the engaging combination of the 1st gear shown in FIG. 2A is set, the engine brake is switched between an enabled state and a disabled state by engaging or releasing the brake B3, as already described. That is, in the 1st gear, in a case in which the brake F1 is in the one-way rotation permission state, and the engaging combination of the 1st gear is set, when the B3 is engaged, the engine brake is enabled. This is equivalent to a case in which the brake F1 is in the rotation inhibition state, and the engaging combination of the 1st gear is set. Even if the brake F1 is in the rotation inhibition state, and the brake B3 is further engaged, traveling is not impeded at all.

When the brake F1 is in the one-way rotation permission state, and the brake B3 is engaged, even if the driving force from the wheels acts on the carriers Cr1 and Cr2 in the direction of the arrow D2, as shown in FIG. 9B, the brake B3 (and the brakes B1 and B2) bears the load. As a result, the burden on a swing portion TW13 is reduced or becomes almost 0, and an end of the swing portion TW13 does not strongly mesh with a concave portion TW18. In particular, when the brake B3 is engaged before the load in the direction of the arrow D2 acts on the brake F1, even if the load in the direction of the arrow D2 acts after that, the load is borne by the brake B3, and the brake F1 does not substantially bear the load.

When the brake B3 is engaged in this way, the brake F1 can smoothly be switched from the rotation inhibition state to the one-way rotation permission state even in a case in which the vehicle is traveling downhill by inertia. Even when the brake B3 is engaged in advance at the time of selection of the 1st gear, traveling is not impeded.

Figure 11:
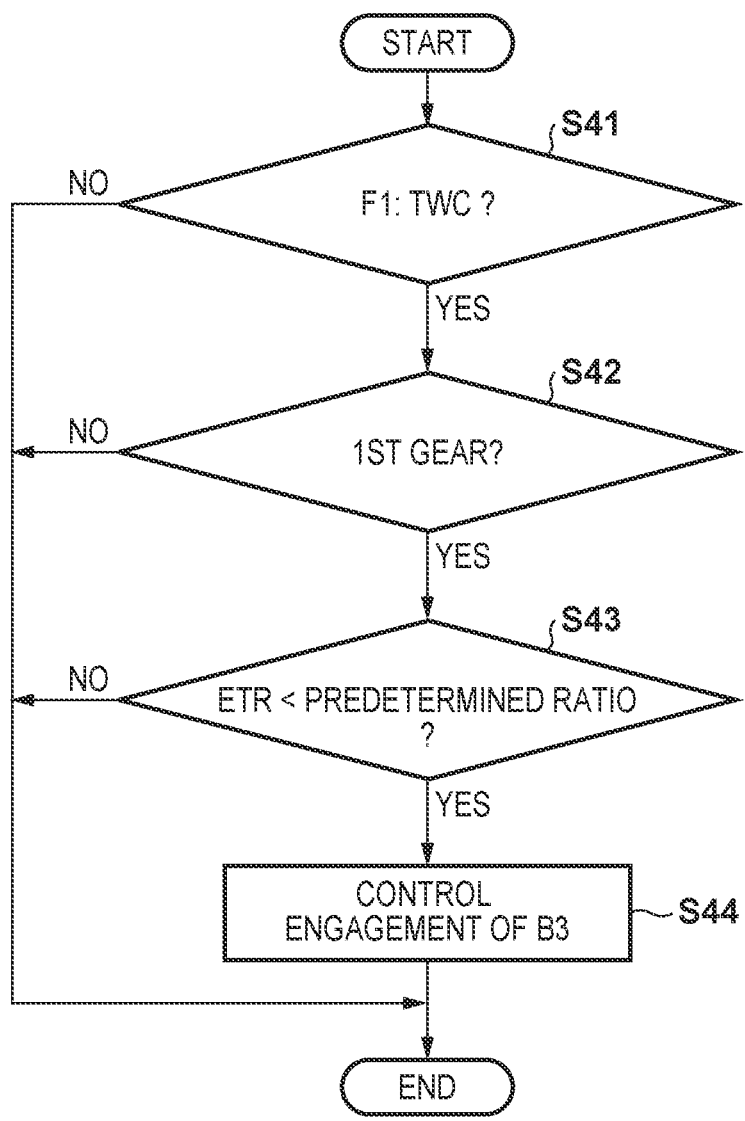
FIG. 11 is a flowchart showing an example of processing according to the second embodiment.

An example of processing executed by a processing unit 101 concerning the switching preparation control will be described next with reference to FIG. 11.

In step S41, it is determined whether the current gear range is the 1st gear. If the current gear range is the 1st gear, the process advances to step S42. If the current gear range is not the 1st gear, the processing of one unit ends. In step S42, it is determined whether the brake F1 is in TWC (rotation inhibition state). If the brake F1 is in TWC, the process advances to step S33. If the brake F1 is in OWC (one-way rotation permission state), the processing of one unit ends.

In step S43, it is determined whether there is a possibility that a load in the direction D2 is acting on the brake F1. For this determination, another parameter can also be employed. In this embodiment, however, the slip ratio of a torque converter TC is used as a reference, and it is determined whether the slip ratio of the torque converter TC is less than a predetermined ratio. The predetermined ratio is, for example, 100%.

A case in which the ETR is less than 100% is a case in which the driving force is input from an internal combustion engine EG, and the vehicle is assumed to be in an acceleration state, as already described. To the contrary, a case in which the ETR is not less than 100% is a case in which the vehicle is traveling at a constant speed or decelerating, or traveling downhill by inertia. In this state, a load in the direction D2 is readily strongly applied to the carriers Cr1 and Cr2 (to the brake F1).

If the ETR is less than the predetermined ratio in step S43, the process advances to step S44. If the ETR is not less than the predetermined ratio, the processing of one unit ends.

In step S44, processing of engaging the brake B3 is executed. Accordingly, before the load in the direction D2 is strongly applied to the carriers Cr1 and Cr2 (to the brake F1), preparation to allow the brake B3 to bear the load is made. Note that in this embodiment, the brake B3 is engaged when the ETR is less than the predetermined ratio. However, the ETR need not always be used. When the brake F1 is in TWC, and the 1st gear is established, the brake B3 may uniformly be engaged.

Figure 12:
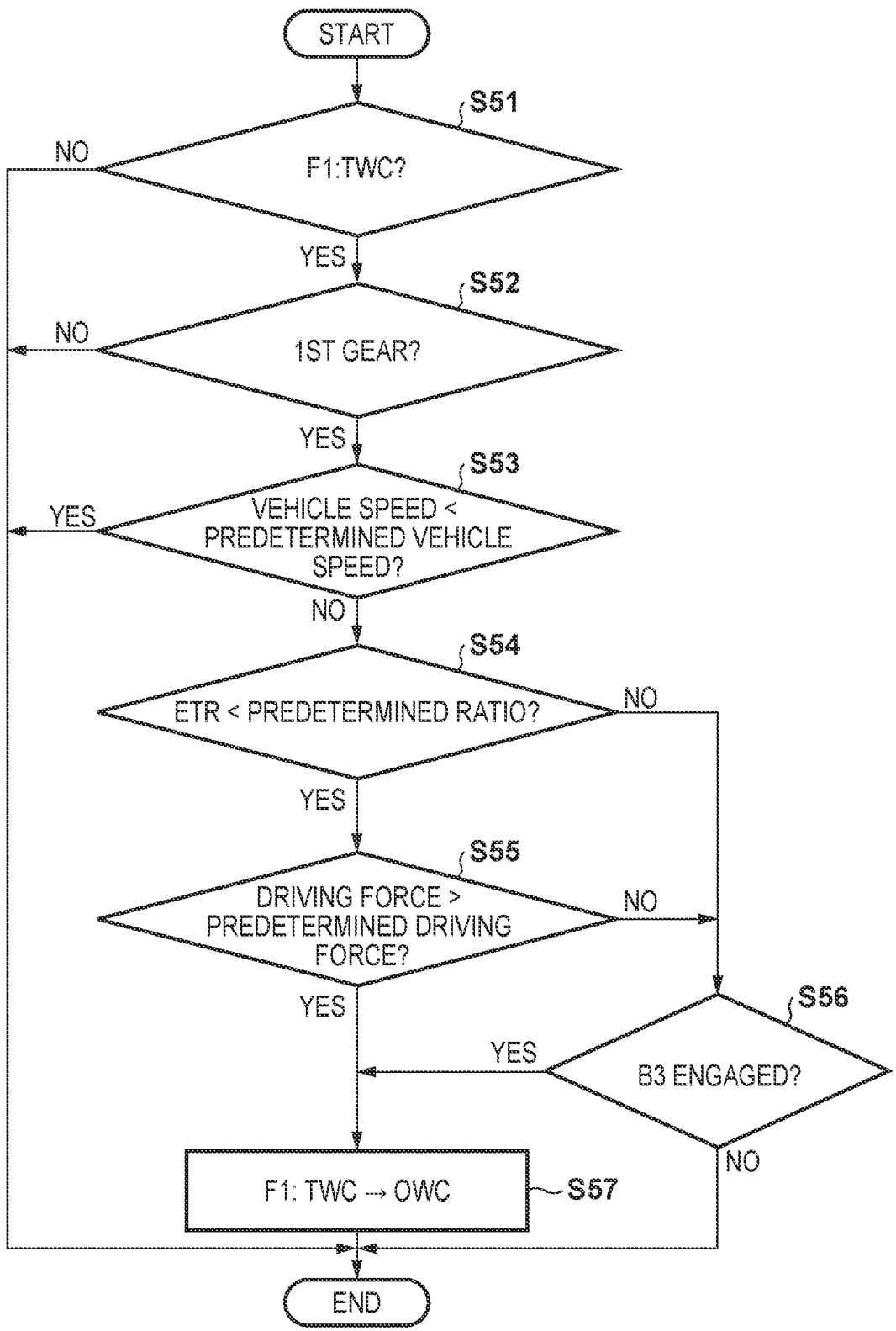
FIG. 12 is a flowchart showing an example of processing according to the second embodiment.

An example of processing executed by the processing unit 101 concerning switching control of switching the brake F1 from TWC to OWC in the 1st gear will be described next with reference to FIG. 12.

In step S51, it is determined whether the brake F1 is in TWC (rotation inhibition state). If the brake F1 is in TWC, the process advances to step S52. If the brake F1 is in OWC (one-way rotation permission state), the processing of one unit ends. In step S52, it is determined whether the current gear range is the 1st gear. If the current gear range is the 1st gear, the process advances to step S53. If the current gear range is not the 1st gear, the processing of one unit ends.

In step S53, it is determined whether the vehicle speed is less than a predetermined vehicle speed. If the vehicle speed is less than the predetermined vehicle speed, the brake F1 is kept in TWC, and the processing of one unit ends. If the vehicle speed is equal to or more than the predetermined vehicle speed, the process advances to step S54. If the vehicle speed is less than the predetermined vehicle speed, there is a possibility that the gear range is switched to the reverse range. Hence, in this embodiment, the brake F1 is maintained in TWC. On the other hand, if the vehicle speed is equal to or more than the predetermined vehicle speed, the possibility that the gear range is switched to the reverse range becomes low. Hence, the brake F1 can be switched to OWC. The predetermined vehicle speed can be, for example, 8 km/h. Alternatively, it may be, for example, 5 km/h. Otherwise, it may be, for example, 3 km/h.

In step S54, it is determined whether there is a possibility that a load in the direction D2 is acting on the brake F1. For this determination, another parameter can also be employed. In this embodiment, however, the slip ratio of the torque converter TC is used as a reference, and it is determined whether the slip ratio of the torque converter TC is less than a predetermined ratio. The predetermined ratio is, for example, 100%. This is the same determination as in step S33.

If the ETR is not less than the predetermined ratio, it is determined that the possibility that a load in the direction D2 is acting on the brake F1 is high, and the process advances to step S56. If the ETR is less than the predetermined ratio, it is determined that the possibility that a load in the direction D2 is acting on the brake F1 is low, and the process advances to step S55.

In step S55, it is determined whether the driving force exceeds a predetermined driving force. This is the same processing as in step S35. If the driving force exceeds the predetermined driving force, the process advances to step S57. If the driving force does not exceed the predetermined driving force, the process advances to step S56.

When the ETR is not less than the predetermined ratio, or when the driving force is not more than the predetermined driving force, the load in the direction D2 acts on the carriers Cr1 and Cr2 (on the brake F1). However, in a state in which the brake B3 is engaged by the processing shown in FIG. 11, the brake F1 can be switched from TWC to OWC. Hence, in step S56, it is determined whether the brake B3 is engaged. If the brake B3 is engaged, the process advances to step S57. If the brake B3 is not engaged, the brake F1 is kept in TWC, and the processing of one unit ends.

The determination of step S56 to determine whether the brake B3 is engaged may be done based on, for example, whether the detection result of the supplied oil pressure to the brake B3 reaches a predetermined oil pressure. Additionally, in step S56, a condition that the actual ratio of the automatic transmission 1 is a ratio corresponding to the 1st gear may be used in addition to the engagement of the brake B3. The actual ratio can be calculated from the detection results of an input shaft rotation speed sensor 112 and an output shaft rotation speed sensor 113.

In step S57, processing of switching the brake F1 from TWC to OWC is executed. After that, the processing of one unit ends.

SUMMARY OF EMBODIMENTS

1. A control apparatus (for example, 100) according to the above embodiment is a control apparatus of an automatic transmission (for example, 1),
wherein the automatic transmission includes:
an input shaft (for example, 10) to which a driving force is input from a driving source (for example, EG) through a torque converter (for example, TC);
an output member (for example, 11);
a plurality of planetary gear mechanisms (for example, P1-P4) configured to transmit the driving force input to the input shaft to the output member; and
a plurality of engaging mechanisms (for example, C1-C3, B1-B3, F1) capable of establishing a plurality of gears by switching a transmission path of the driving force in the plurality of planetary gear mechanisms, one of the plurality of engaging mechanisms is a mechanical engaging mechanism (for example, F1) functioning as a brake, the mechanical engaging mechanism can be switched to a first state (for example, OWC) in which only rotation of a predetermined rotational element (for example, Cr1, Cr2) of a plurality of rotational elements provided in the plurality of planetary gear mechanisms in a first direction (for example, D1) is restricted and a second state (for example, TWC) in which the rotation of the predetermined rotational element in both the first direction and a second direction (for example, D2) reverse to the first direction is restricted, the plurality of gears include:

a lowest forward speed gear (for example, 1st) in which the mechanical engaging mechanism can be established in both the first state and the second state;

a forward gear (for example, 2nd-10th) in which a gear ratio is higher than in the lowest forward speed range, and the mechanical engaging mechanism cannot be established in the second state; and a reverse gear (for example, RVS) in which the mechanical engaging mechanism is established in the second state, the control apparatus comprises:

a determination unit (for example, 101, S33-S36, S53-S55) configured to, when a selected gear is the lowest forward speed gear, and the mechanical engaging mechanism is in the second state, determine whether to switch the mechanical engaging mechanism to the first state; and a switching processing unit (for example, 101, S37, S56) configured to switch the mechanical engaging mechanism to the first state based on a determination result of the determination unit, and the determination unit determines to switch the mechanical engaging mechanism to the first state at least on condition that the driving force is larger than a predetermined driving force (for example, S35).

According to this embodiment, when the switching load is small, the mechanical engaging mechanism can be switched to the first state in advance. It is therefore possible to cope with a traveling state in which switching is difficult in advance while reducing the driving force necessary for switching of the mechanical engaging mechanism.

2. In the control apparatus (for example, 100) according to the above embodiment, the predetermined driving force is set based on at least one of an oil temperature of hydraulic oil of the automatic transmission, a vehicle speed of a vehicle in which the automatic transmission is mounted, and a down gradient of a traveling road on which the vehicle travels.

According to this embodiment, the predetermined driving force is set as a variable value. This makes it possible to cope with a traveling state in which switching is difficult in advance while reducing the driving force necessary for switching of the mechanical engaging mechanism in accordance with the state of the automatic transmission.

3. In the control apparatus (for example, 100) according to the above embodiment, the determination unit determines to switch the mechanical engaging mechanism to the first state at least on condition that a slip ratio of the torque converter is lower than a predetermined ratio, and the driving force is larger than the predetermined driving force (for example, S33, S35, S53, S54).

According to this embodiment, it is possible to more reliably determine whether a state in which the switching load is small is set.

4. In the control apparatus (for example, 100) according to the above embodiment, the determination unit determines to switch the mechanical engaging mechanism to the first state at least on condition that a vehicle in which the automatic transmission is mounted travels downhill, and the driving force is determined to be larger than the predetermined driving force (for example, S34, S35).

According to this embodiment, it is possible to do pre-switching of the mechanical engaging mechanism to prepare for downhill traveling in which the switching load readily becomes large.

5. In the control apparatus (for example, 100) according to the above embodiment, the plurality of engaging mechanisms include a predetermined engaging mechanism (for example, B3), the predetermined engaging mechanism is an engaging mechanism capable of bearing a load that acts in the second direction on the predetermined rotational element by engagement in a case in which the selected gear is the lowest forward speed gear, and the mechanical engaging mechanism is in the second state, because of a structure of the automatic transmission, and the control apparatus further comprises an engagement processing unit (for example, 101, S44) capable of engaging the predetermined engaging mechanism in the case in which the selected gear is the lowest forward speed gear, and the mechanical engaging mechanism is in the second state.

According to this embodiment, it is possible to create a state in which the switching load is small.

6. In the control apparatus (for example, 100) according to the above embodiment, even in a case in which the driving force is not larger than the predetermined driving force, if the predetermined engaging mechanism is engaged, the determination unit determines to switch the mechanical engaging mechanism to the first state (for example, S55).

According to this embodiment, it is possible to switch the mechanical engaging mechanism in a state in which the switching load is small.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2017-072030, filed Mar. 31, 2017, which is hereby incorporated by reference herein in its entirety.

What is claimed is:

1. A control apparatus of an automatic transmission, wherein the automatic transmission includes:
an input shaft to which a driving force is input from a driving source through a torque converter;
an output member;
a plurality of planetary gear mechanisms configured to transmit the driving force input to the input shaft to the output member; and
a plurality of engaging mechanisms capable of establishing a plurality of gears by switching a transmission path of the driving force in the plurality of planetary gear mechanisms,
one of the plurality of engaging mechanisms is a mechanical engaging mechanism functioning as a brake,
the mechanical engaging mechanism can be switched to a first state in which only rotation of a predetermined rotational element of a plurality of rotational elements provided in the plurality of planetary gear mechanisms in a first direction is restricted and a second state in which the rotation of the predetermined rotational element in both the first direction and a second direction reverse to the first direction is restricted, the plurality of gears include:

a lowest forward speed gear in which the mechanical engaging mechanism can be established in both the first state and the second state;

a forward gear in which a gear ratio is higher than in the lowest forward speed gear, and the mechanical engaging mechanism cannot be established in the second state; and a reverse gear in which the mechanical engaging mechanism is established in the second state, the control apparatus comprises:

a determination unit configured to, when a selected gear is the lowest forward speed gear, and the mechanical engaging mechanism is in the second state, determine whether to switch the mechanical engaging mechanism to the first state; and a switching processing unit configured to switch the mechanical engaging mechanism to the first state based on a determination result of the determination unit, the determination unit determines to switch the mechanical engaging mechanism to the first state at least on both of a first condition and a second condition, the first condition is that a vehicle in which the automatic transmission is mounted travels downhill, and the second condition is that the driving force is larger than a predetermined driving force, and the predetermined driving force is set based on: an oil temperature of hydraulic oil of the automatic transmission; a vehicle speed of a vehicle in which the automatic transmission is mounted; and/or a down gradient of a traveling road on which the vehicle travels.

2. The apparatus according to claim 1, wherein the plurality of engaging mechanisms include a predetermined engaging mechanism, the predetermined engaging mechanism is an engaging mechanism capable of bearing a load that acts in the second direction on the predetermined rotational element by engagement in a case in which the selected gear is the lowest forward speed gear, and the mechanical engaging mechanism is in the second state, because of a structure of the automatic transmission, and the control apparatus further comprises an engagement processing unit capable of engaging the predetermined engaging mechanism in the case in which the selected gear is the lowest forward speed gear, and the mechanical engaging mechanism is in the second state.

3. The apparatus according to claim 2, wherein even in a case in which the driving force is not larger than the predetermined driving force, if the predetermined engaging mechanism is engaged, the determination unit determines to switch the mechanical engaging mechanism to the first state.

\* \* \* \* \*